United States Patent [19]

Makino

[11] 4,016,475
[45] Apr. 5, 1977

[54] DC TO DC CONVERTER

[75] Inventor: Hiroshi Makino, Hirakata, Japan

[73] Assignee: West Electric Company, Ltd., Japan

[22] Filed: Nov. 14, 1975

[21] Appl. No.: 631,873

[30] Foreign Application Priority Data

Nov. 19, 1974 Japan .................. 49-133938

[52] U.S. Cl. .................. 321/2; 321/45 R
[51] Int. Cl.² .................. H02M 3/335
[58] Field of Search .......... 321/2, 45 R; 315/241 P; 331/113 A

[56] References Cited

UNITED STATES PATENTS

| 3,213,346 | 10/1965 | King, Jr. | 321/2 |
| 3,383,624 | 5/1969 | Fiala | 321/2 |
| 3,453,520 | 7/1969 | Mas | 321/2 |

Primary Examiner—William M. Shoop
Attorney, Agent, or Firm—Burgess Ryan and Wayne

[57] ABSTRACT

A DC to DC converter includes a push pull oscillating circuit having a pair of active components, the anodes of which are connected to each end terminal of the primary winding of a saturable inverter transformer. A secondary winding of the saturable inverter transformer is connected to a load through which the output of the secondary winding is positively fed back to the control electrodes through the cathodes of the active components. The whole circuitry is operated by low voltage small dry cells connected between the midpoint of the primary winding and the cathodes of the active components providing high DC output to the load.

5 Claims, 7 Drawing Figures

DC TO DC CONVERTER

BACKGROUND OF THE INVENTION

This invention relates to a DC to DC converter.

In one of conventional DC to DC converter, the current induced in subsidiary windings is positively fed back to the bases of a pair of transistors to start oscillation in the oscillating circuit, and the AC output voltage is applied to a load after the rectification of it.

When the load is a condenser for this type of DC to DC converter, it is necessary to design the control circuits and the output circuits of the transistors in such way that the circuit can permit large current. For this reason, when the charging current is reduced at the end of charging, the current through the base and cathode remains large and the current is dicipated in the circuit, and the life of the voltage source is shortened and the converter efficiency is very low.

Further in another conventional DC to DC converter, the base current of a transistor in an oscillating circuit passes through a load; therefore the loss due to the base current is very low, but the loss due to a reversing condenser connected with the secondary winding of a saturable inverter transformer is high, and the converter efficiency cannot be increased. Moreover, since the oscillating circuit comprises a single in this type of converter, a load condenser cannot be charged rapidly.

SUMMARY OF THE INVENTION

The object of this invention is to provide an efficient DC to DC converter.

Another object of this invention is to provide a DC to DC converter that is more economical by prolonging the life of the cells used.

Still another object of this invention is to provide a DC to DC converter having a simple configuration and achieving the above objects.

Fundamentally this invention comprises:

a saturable inverter transformer having a primary and a secondary windings; a push-pull oscillation circuit having a pair of active components whose anodes are connected to the opposite end terminals of the primary winding of the saturable inverter transformer respectively; a DC source being connected between the cathodes of the active components and the midpoint of the primary winding of the saturable inverter transformer; a load being connected between the secondary winding of the saturable inverter transformer and the cathodes of the active components; and a positive feedback circuit feeding the output of the inverter transformer to the control electrode through the cathode of the active components and the load.

Other objects and features of this invention will best be understood by reference to the detailed description of the invention.

DETAILED DESCRIPTION OF THE INVENTION

Prior Art

Figure 1:
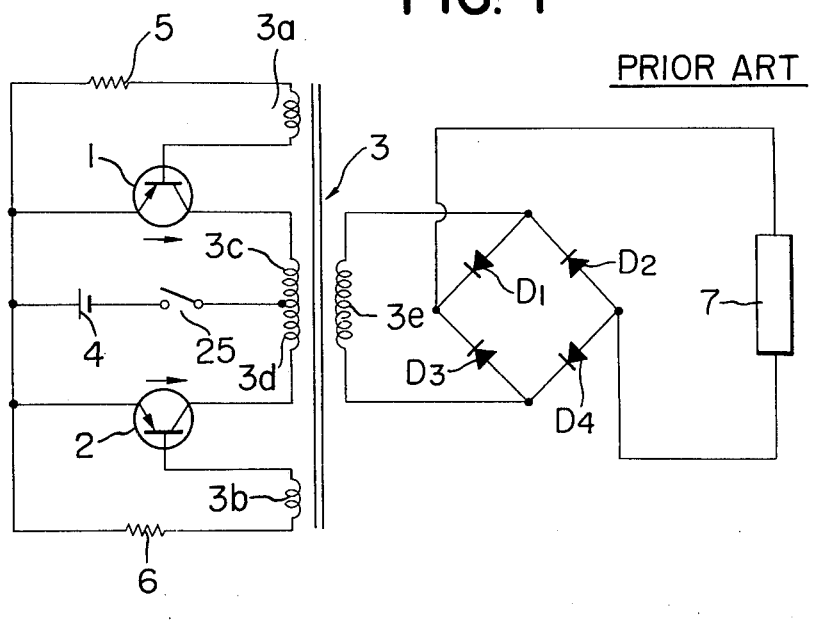
FIG. 1 shows a DC to DC converter of a conventional circuit.

FIG. 1 shows a circuit of a conventional DC to DC converter in which a DC source 4 is connected between the midpoint of a primary winding of a saturable inverter transformer 3 and the emitters of transistors 1 and 2. The base of the transistor 1 is connected to the emitter of the transistor 1 through a subsidiary winding 3a coupled to the inverter transformer 3 and a resistor 5. The base of the transistor 2 is connected to the emitter of the transistor 2 through a subsidiary winding 3b of the transformer 3 and a resistor 6. The output terminal of a secondary winding 3e is connected across a full wave rectifier having diodes D1, D2, D3, and D4. The output terminals of the rectifier are connected to a load 7, such as a condenser across the load 7.

When one of the transistors 1 and 2 is conductive, the voltage induced in the corresponding subsidiary winding of the inverter transformer 3 is positively fed back to the base of the transistor and self-oscillation starts. The voltage induced in the secondary winding 3e is applied to the full wave rectifier. The voltage rectified by the rectifier is applied to the load 7.

If the load 7 is of high fluctuation type, such as a condenser, firstly charged at several hundred volts and then discharged to start the flash of a flash lamp device, the conversion efficiency is very low and the energy loss of the voltage source 4 is very high.

More in detail at the start of a charging cycle of a condenser, the instantaneous resistance condenser is virtual short circuit, as is well known. In order to supply a sufficient current to charge a condenser in a short time, the resistors 5 and 6 and the subsidiary windings 3a and 3b, in FIG. 1, are so designed that they permit a relatively large base current passing between the collectors and the emitters of the transistors 1 and 2. At the end of the charging, the charging cycle current is less in value; whereas the base current is still large. Accordingly a considerable loss due to the base current exists, which will lower the conversion efficiency remarkably.

For the convenience of transportation, small-size dry cells are used as the voltage source of the circuit. Consequently their lives became very short and soon they become unserviceable through the loss.

Figure 2:
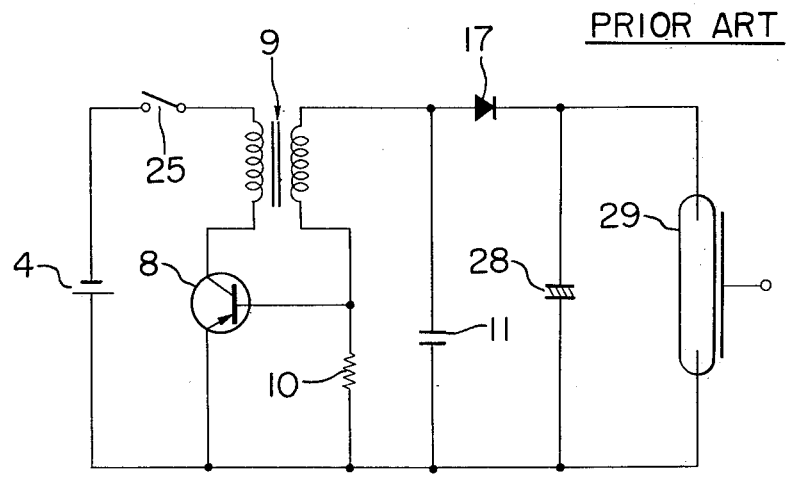
FIG. 2 shows another conventional DC to DC converter circuit installed with a flash device.

FIG. 2 shows another DC to DC converter circuit of conventional type. In this circuit a DC source 4 is connected across a transistor 8 through the primary winding of the transformer 9. A terminal of the secondary winding of the transformer 4 is connected to the base of the transistor 8 and to the emitter of the transistor 8 through a resistor 10. A terminal of a load 28 is connected to the other terminal of the secondary winding of the transformer 9 through a diode 17. The other terminal of the load 28 is connected to the other terminal of the secondary winding and the base of the transistor 8 through the resistor 10 and to the emitter of the transistor 8. This configuration is developed for the purpose of improving the efficiency of the converter. The load 28 is shunted by a flash lamp 29. The load 28 may be a condenser. The diode 17 and the load 28 are also shunted by a condenser 11 as shown in the figure.

As is clear from the figure, when a current is supplied from the secondary of the transformer 9 to the load 28, the current is positively fed back to the base of the transistor 8 through the load 28. Ths is, of course, a well known art. In this device the base current is lessened when charging of the condenser is completed; so that the unnecessary loss due to the base current is prevented.

However, if an impedance of a charging circuit is resistive, the energy loss due to the resistance becomes very large due to charging characteristic of a condenser. For this reason the conversion efficiency — that is the ratio of the energy stored in the condenser to the output energy of the dry cells — is at most 50 per cent.

In this circuit, the condenser 11 is connected across the secondary winding of the transformer through the resistor 10. The discharge current in the reversed direction of the polarity of this condenser flows through the secondary winding of the transformer 9, and saturates the transformer 9. Consequently there is still another loss due to the charging and discharging of the condenser 11.

Another defect of this prior configuration is that the condenser can not be charged during the non-conduction of the transistor 8, and the rapid charging of the condenser cannot be achieved.

PREFERRED EMBODIMENTS OF THE INVENTION

Figure 3:
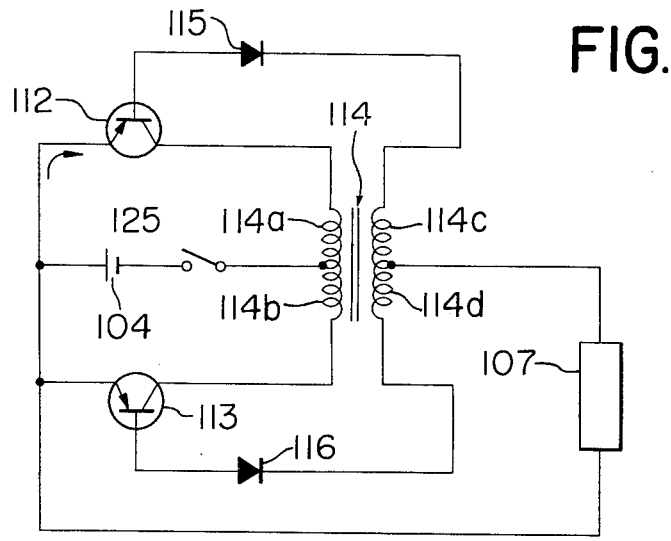
FIG. 3 shows an embodiment of the present invention.

Referring to FIG. 3, the circuit of the present invention includes a voltage source 104 being connected between the emitters of a pair of transistors 112 and 113 and the collectors of the transistors through a switch and each of the halves 114a and 114b of a primary winding of the saturable inverter transformer 114. A diode 115 is connected between the base of the transistor 112 and one end terminal of the secondary winding of the saturable inverter transformer 114, and another diode 116 is connected between the base of the transistor 113 and another end terminal of the secondary winding of the transformer 114. A load 107, which is, for example, a condenser, is connected between the midpoint of the secondary winding of the transformer 114 and the emitters of the transistors 112 and 113.

Upon closing the switch 125, one of the two transistors 112 and 113 becomes conductive. This start of conduction depends on the characteristics of the transistor 112 or 113 and the numbers of windings of the inverter transformer 114. In the following description we assume that the transistor 112 will start the conduction first.

As the switch 125 is closed, the transistor 112 becomes conductive and a current flows through a half 114a of the primary winding, and a voltage is induced in the secondary winding 114c. By the induced voltage, a current is positively fed back to the base of the transistor 112 through the load 107 and the cathode of the transistor 112. The more collector current flows through the diode 115 and the load 107 is charged. Since the induced voltage in the secondary winding 114c biases the diode 116 in the opposite direction, the transistor 113 does not become conductive.

As the transformer 114 reaches a saturated state, the induced voltage in the secondary winding 114c decreases and the voltage induced in the secondary winding 114c reverses its polarity, and the conduction of the transistor 112 terminates. The reversed voltage of the induced voltage in the secondary winding alternatively turns the transistor 113 conductive and the collector current of the secondary winding of the transformer 114 is positively fed back to the base of the transistor 113 through the load 107 and the cathode of the transistor 112. This process of oscillation will continue as long as the switch 125 is closed.

Figure 4:
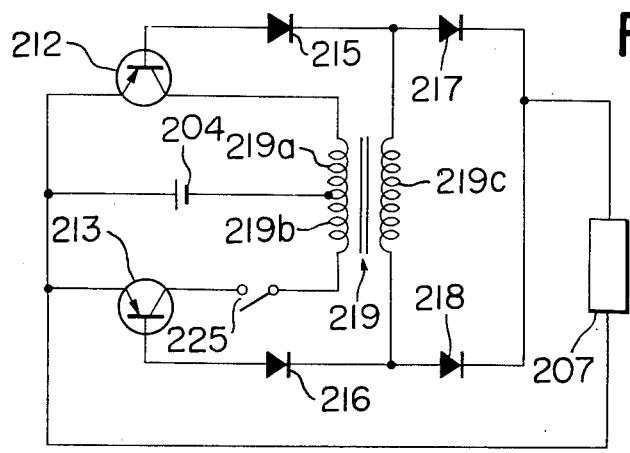
FIGS. 4, 5, 6 and 7 show various embodiments of the present invention respectively.

FIG. 4 shows another embodiment of the present invention, in which diode 217 is connected between one terminal of a load 207 and a junction of a diode 215 and one terminal of a winding of a saturable inverter transformer 219; another diode 218 is connected between the same terminal of the load 207 and a junction of a diode 216 and the other terminal of the secondary winding of the saturable inverter transformer 219. The other terminal of the load 207 is connected to emitters of transistors 212 and 213. As is clear from the figure, the oscillation circuit of this embodiment is almost the same as that of FIG. 3, except the configuration of the secondary side of the saturable inverter transformer 219.

The improvement of the circuit shown in FIG. 4 is the reduction of excessive insulation between terminals of the saturable inverter transformer 219. As is clear from FIG. 3, the voltage across two parts 114c and 114b of the secondary winding of the saturable inverter transformer 114 is twice the voltage across the load. This will necessitate the high insulation between various terminals of the secondary winding of the transformer 114, whereas in the circuit shown in FIG. 4, the voltage across the secondary winding 219c is the same as that across the load 207. This means the reduction in size and cost of the device.

Figure 5:
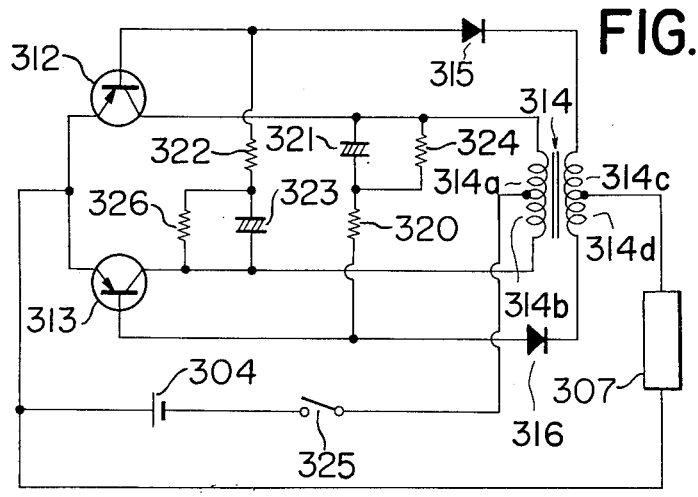

FIG. 5 is still another embodiment of the present invention, wherein oscillation can be started more smoothly than that in the other embodiments. Once the oscillation be started, it can be maintained until the energy in oscillation condensers 321 and 323 is discharged, after the energy supply is cut off from the DC voltage source 304.

In this circuit, the oscillation condenser 321 is connected between the collector terminal of a transistor 312 and the base of a transistor 313 through a resistor 320. Condenser 321 is connected in parallel with a resistor 324; and the oscillation condenser 323 is connected between the collector terminal of the transistor 313 and the base of the transistor 312 a resistor 322 condenser 323 is connected in parallel with a resistor 326. The remaining circuit configuration is the same as that of FIG. 3.

As the switch 325 is closed, the transistor 312 becomes conductive as described previously, which charges the condenser 323 through the resistor 322 and starts oscillation in a half 314a of primary winding 314. The condensers 323 and 321 are alternatively charged and their corresponding transistors become conductive alternatively.

After the start of the oscillation, a current flows through the load 307 to each base of the transistors 312 and 313 as stated before. The oscillation is maintained by the oscillators. If the resistance of the resistors 324 and 326 selected large in value, almost no current flows through each base of the transistors 312 and 313.

Figure 6:
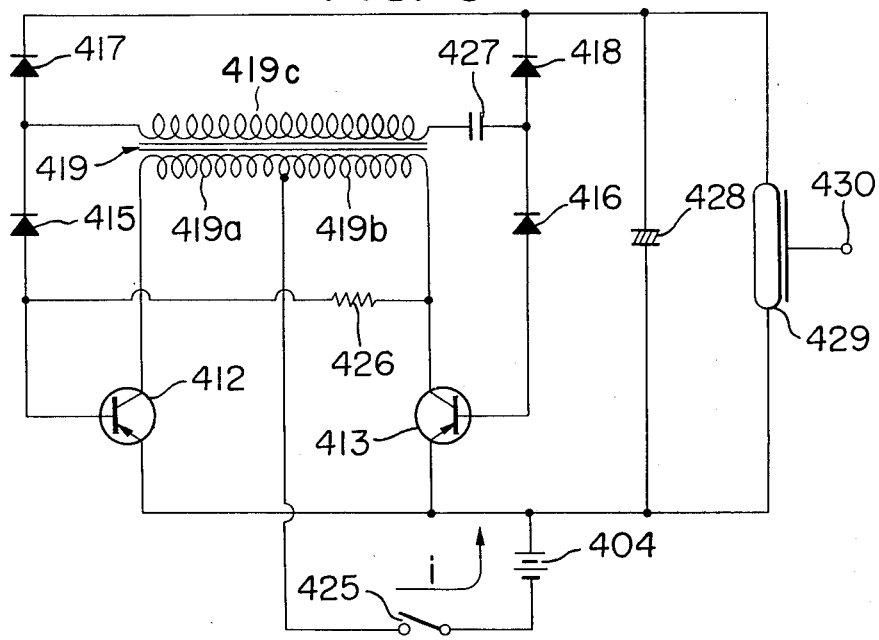

FIG. 6 shows still another embodiment of the present invention, a DC to DC converter of which is suitable to generate high voltage for a flash lamp device. The circuitry is very similar to that depicted in FIG. 4 with the exception of a resistor 426 being connected between the base of a transistor 412 and the collector of a transistor 413. A condenser 427 is connected in series with the secondary winding 419c of a saturable inverter transformer 419, and a flash lamp 429 is connected to both end terminals of the secondary winding of the inverter transformer 419 through diodes 418 and 419 and a condenser 427 and to the emitters of transistors 412 and 413 across the load 428 which is a condenser, for example. The flash discharge device 429 contains a rare gas such as zenon and having a trigger electrode 430.

When the switch 425 is closed, a current from a DC cells 404 flows through the emitter and the base of the transistor 412, the resistor 426, a half 419b of the primary winding of the inverter transformer 419, the switch 425, and induces a voltage across the secondary winding 419c.

The induced voltage supplies current in the circuit comprising the condenser 427, the diode 418, the main condenser 428, the emitter and the base of the transistor 412, and the diode 415. With the conduction of the transistor 412, a heavy current flows through a half 419a of the primary winding of the inverter transformer 419, which induces a high voltage across the secondary winding 419c of the transformer 419 and charges the main condenser 428.

When the saturable inverter transformer 419 reaches to its saturation, the voltage induced across the secondary winding 419c of the inverter transformer 419 is reduced and then its polarity is reversed. On the other hand, the circuit comprising the transistor 413, the diode 416, the condenser 427, the secondary winding 419c of the transformer 419, the diode 417, and the main condenser 428 is energized. Thus the transistor 413 becomes conductive.

As the transistor 413 becomes conductive, the voltage induced in the secondary winding of the transformer charges the main condenser 428.

With the resaturation of the inverter transformer, the polarity of the voltage induced across the secondary winding 419c is reversed and the transistor 412 becomes conductive again. The frequency of the condenser charging can be determined by the time constant of the circuit.

When the voltage across the condenser 428 reaches to a value sufficient to flash the flash device 429, a trigger voltage of several thousand volts is applied to a trigger electrode 430 of the flash device 429 from a trigger voltage generator, (not shown), and the condenser is discharged. The condenser 428 is then charged again.

EXAMPLE I

The circuit was comprising:
Inverter transformer 419
  Primary winding 419a: 20 turns
  Primary winding 419b: 20 turns
  Secondary winding: 400 turns
  Condenser 427: 0.01 $\mu$F
  DC source: 12 volts
  Main condenser 428: 5.8 $\mu$F When the above described circuit was operated, under condition that the flash device 429 was repetatively flashed at the period of 1/30 second, the current taken from the DC source was 0.60 amp. and the maximum charged voltage across the main condenser 428 was 232 volts.

The energy in watt supplied by the DC source 404 is $$12 (V) \times 0.6 (A) = 7.2 (W)$$

The energy in watt supplied to the flash device from the main condenser was:

$$\tfrac{1}{2} \times 5.6 \times 10^{-6} \times 232^2 (V) \times 30/\text{Sec} = 4.5 (W)$$

The efficiency was $$(4.5/7.2) \times 100 = 63\%$$

This efficiency is much higher than that of the conventional device shown in FIG. 2; which was 35%.

Figure 7:
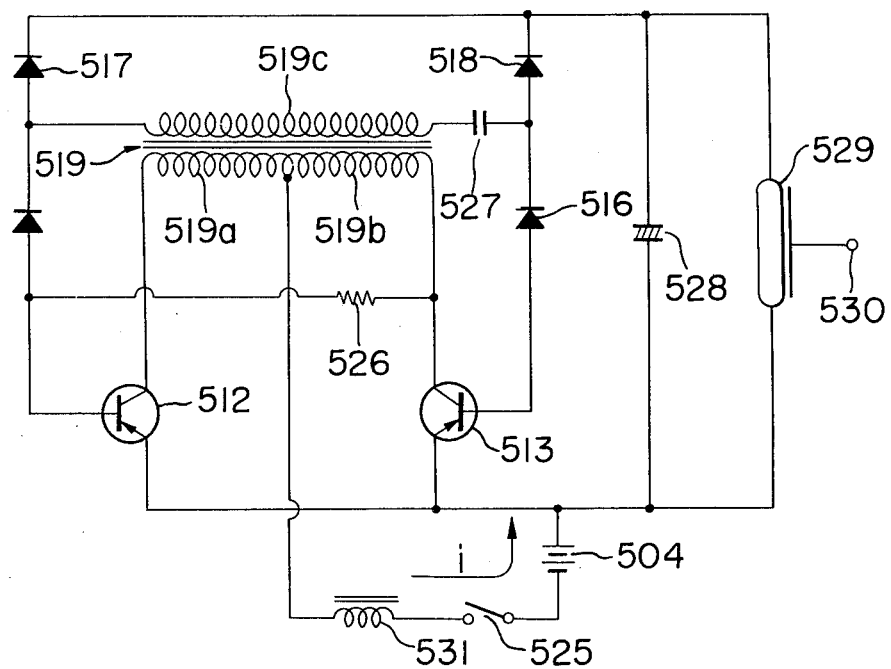

FIG. 7 shows still another embodiment of this invention, in which choke coil 531 is incorporated in power supply circuit between a DC source 504 and the midpoint of a primary winding of a saturable inverter transformer 519. All the remaining portions of the circuitry is the same as that shown in FIG. 6. The circuit functions also the same as that of the previous FIG. 6 except the easy start of oscillation by means of the choke coil 531.

EXAMPLE II

A circuit comprising the following elements was constructed:
Choke coil 531: 10 turns around a core
All other elements such as inverter transformer 519, condenser 527, DC source, main condenser, were similar to those listed in the description for FIG. 6.

The result obtained was: DC current from the DC source: 0.47 amp. Maximum charging voltage across the main condenser 528: 235 volts.

The energy supplied from the DC source 504:

$$12 (V) \times 0.47 (A) = 5.64 (W)$$

The energy supplied to the flash device 529 from the main condenser 528:

$$\tfrac{1}{2} \times 5.6 F \times 10^{-6} \times 235^2 (V) \times 30/\text{Sec.} = 4.64(W)$$

The efficiency of the device was:

$$4.64/5.64 \times 100 = 82\%$$

As shown above, the efficiency of the circuitry is higher than that shown in FIG. 6.

It is also possible to use a multiunit transistor 6 – 14 instead of a pair of transistors connected in push-pull form as shown in the figures given above.

As stated above, the induced voltage is positively fed back to the bases of the oscillatory transistors through the load, the condenser shown in FIG. 2 which is used for the reverse of transformer saturation, can be eliminated. This means the elimination of the loss caused by the condenser.

Further in above embodiments of the present invention, a reactance element is connected in series with the secondary winding, or a further reactance element is connected between the DC source and the midpoint of the primary winding, the loss in the circuit is minimized and the reactive energy is effectively utilized.

For this reason the loss in the circuit is very low; so the efficiency of the converter is greatly increased.

What is claimed is:
1. A DC to DC converter comprising:
   a saturable inverter transformer having primary and secondary windings;
   a push-pull oscillation circuit having a pair of transistors whose collectors are connected to opposite end terminals of the primary winding of said saturable inverter transformer respectively;

a DC source being connected between the emitters of said transistors and a midpoint of said primary winding of said saturable inverter transformer;

a condenser being connected between said secondary winding of said saturable inverter transformer and said emitters of said transistors;

a first reactance element connected in series with one terminal of the secondary winding of said saturable inverter transformer;

a resistor connected between the collector of one of said transistors and the base of the other transistor;

a first diode connected between said first reactance element and the base of one of said transistors, the easy conduction direction of said first diode being towards one side of said condenser; and a second diode connected between the base of the other of said transistors and the other terminal of the secondary winding of said saturable inverter transformer, the easy conduction direction of said second diode being towards said one side of said condenser. (FIGS. 6 and 7)

2. A DC to DC converter set forth in claim 2 wherein said reactance element is a condenser.

3. A DC to DC converter set forth in claim 1 further comprising:
a second reactance element connected between said DC source and the midpoint of said primary winding of said saturable inverter transformer.

4. A DC to DC converter set forth in claim 7 wherein said second reactance element is a choke coil.

5. A DC to DC converter comprising:
a saturable inverter transformer having center tapped primary and secondary windings, a pair of transistors, each provided with a base, and emitter and collector, said collectors of said pair of transistors each being separately connected to an opposite end of the primary of said saturable inverter transformer, separate diodes connecting the bases of said pair of transistors separately to opposite ends of the secondary of said transformer, a source of DC voltage connected between the emitters of said pair of transistors and the center tap of the primary of said transformer, and separate r–c circuits cross coupling the base of each transistor of said pair of transistors to the collector of the other member of said pair of transistors, an output of said DC-DC converter being available between the emitters of the transistors and the center tap of the transformer secondary winding.

* * * * *

UNITED STATES PATENT OFFICE
CERTIFICATE OF CORRECTION

Patent No. 4,016,475          Dated April 5, 1977

Inventor(s)   Hiroshi Makino

It is certified that error appears in the above-identified patent and that said Letters Patent are hereby corrected as shown below:

In the Title Page, under "Inventor": The city of the Inventor should be --Osaka-fu --.

In the Title Page: The title should be -- A DC TO DC CONVERTER --.

Column 1, line 27: After "single" insert --transistor--.

Column 2, line 32: After "resistance" insert --of the--.

line 33: Before "virtual" insert --a--.

line 39: After "charging" (1st occurrence) insert --cycle--.

line 39: Before "current" delete "cycle".

UNITED STATES PATENT OFFICE
CERTIFICATE OF CORRECTION

Patent No. 4,016,475    Dated April 5, 1977

Inventor(s) Hiroshi Makino

It is certified that error appears in the above-identified patent and that said Letters Patent are hereby corrected as shown below:

Column 4, line 43: After "312" insert --through--.

line 43: After "322" insert a period.

line 44: Change "condenser" to --Condenser--.

Column 7, line 26: Change "claim 2" to --claim 1--.

Column 8, line 6: Change "claim 7" to --claim 3--.

*Signed and Sealed this*

*Fourth* Day of *October 1977*

[SEAL]

Attest:

RUTH C. MASON
*Attesting Officer*

LUTRELLE F. PARKER
*Acting Commissioner of Patents and Trademarks*